Sept. 29, 1959 — R L KITRELL — 2,906,851
WELDING APPARATUS FOR USE WITH FLEXIBLE DAM
Filed Jan. 28, 1958 — 2 Sheets-Sheet 1
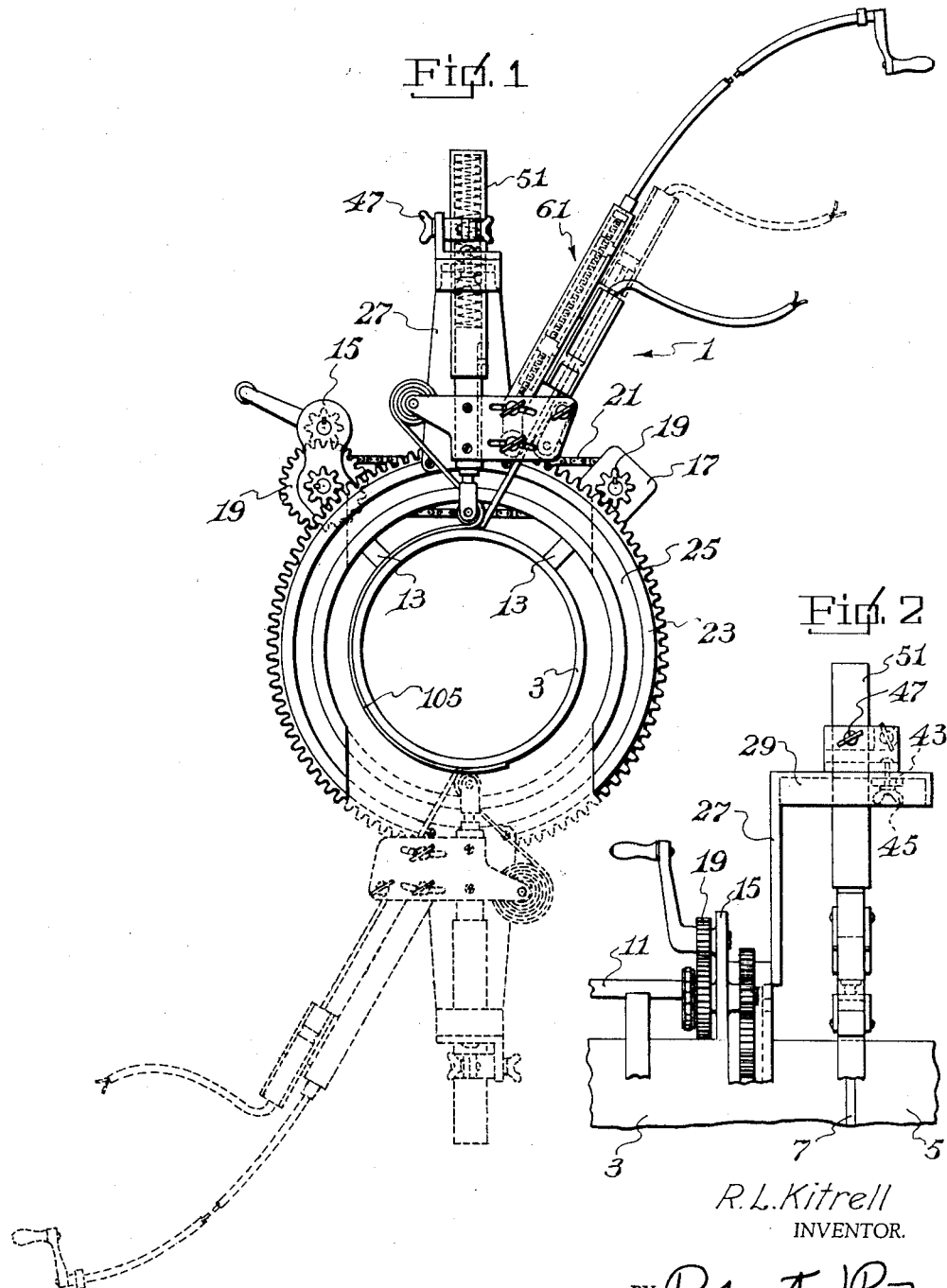
R. L. Kitrell
INVENTOR.

Sept. 29, 1959  R L KITRELL  2,906,851
WELDING APPARATUS FOR USE WITH FLEXIBLE DAM
Filed Jan. 28, 1958  2 Sheets-Sheet 2
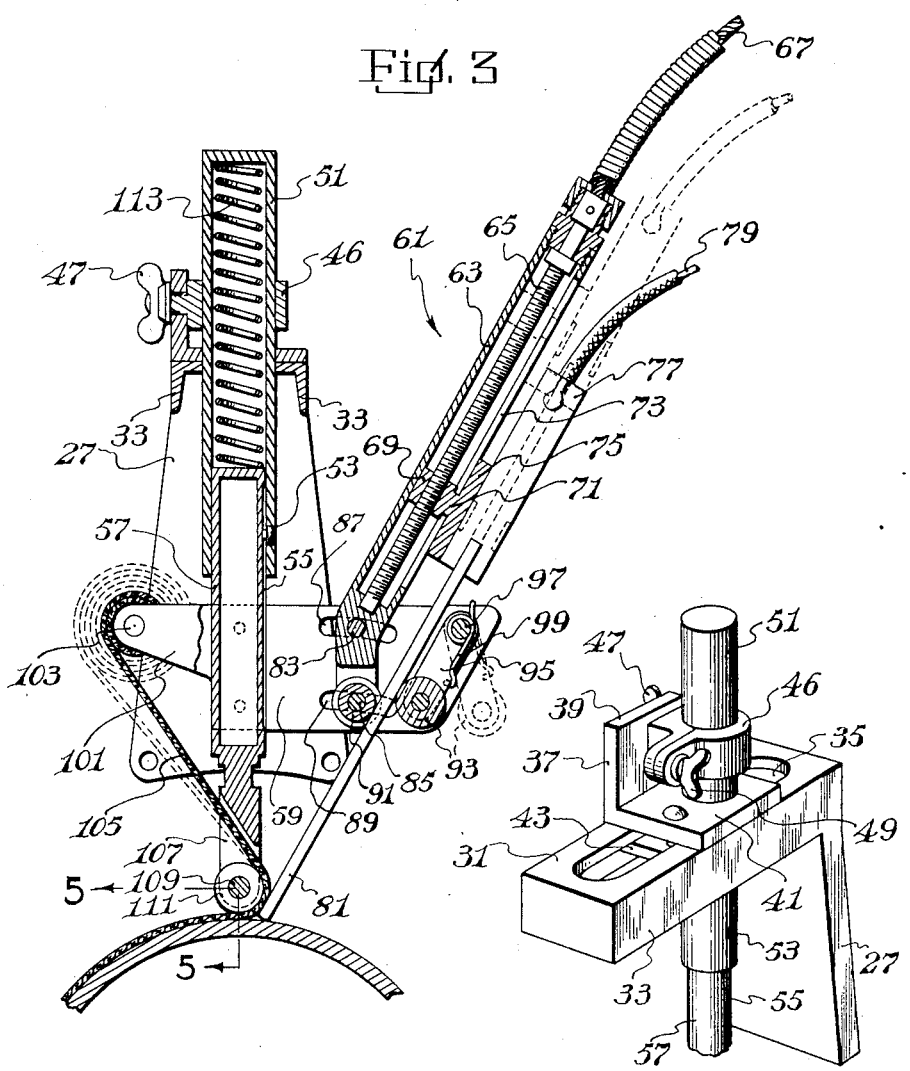
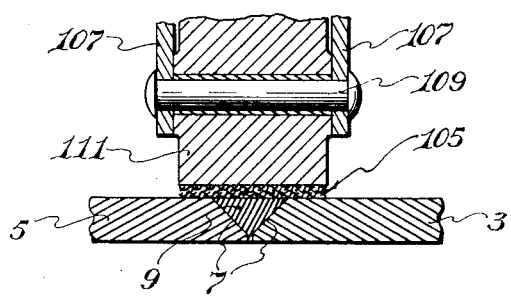
R. L. Kitrell
INVENTOR.
BY Robert J Patm
ATTY

United States Patent Office 2,906,851
Patented Sept. 29, 1959

2,906,851
WELDING APPARATUS FOR USE WITH FLEXIBLE DAM

R L Kitrell, Tulsa, Okla.

Application January 28, 1958, Serial No. 711,599

11 Claims. (Cl. 219—60)

The present invention relates to welding apparatus, and more particularly to welding apparatus adapted to form non-horizontal welds and having provision for covering the molten weld with a dam to retain the molten material in place in the weld.

In the assembly of great lengths of pipe such as pipe lines, it is customary to assemble the pipe line from a plurality of relatively short pipe sections laid end to end. The contiguous ends of each adjacent pair of sections are beveled and butt welded. Since the work can not be rotated, the welding operation requires welding from literally every angle from straight down to straight overhead.

In the past, it has been customary to reduce the amount of welding that must be done in the ditch of a pipe line by welding together two lengths of pipe while they are still on the surface of the ground, a procedure known in this art as "double-jointing." The double-joint is then lowered into the ditch and welded to that portion of the pipe line which has already been laid. It has been necessary for welders to get down into the ditch to work. Naturally, the ditches are not dug much larger than is necessary, so that the welder has been forced into dangerously close contact with his work. The difficulties and dangers of welding in such confined quarters will be especially clear when it is realized that a large proportion of each weld is overhead or vertical work, with the result that there is a good deal of dripping and spatter.

In addition to the dangers involved, it will also be realized that the loss of so much metal from the weld inevitably leaves a weld which is undesirably weak. Furthermore, the irregularities in the weld introduced by such loss of weld metal set up points of galvanic action after the weld has been buried, and this results in excessive localized corrosion.

Although many attempts have been made to overcome the foregoing and other difficulties and disadvantages of the prior art in this area, none, as far as is known, was entirely successful when practiced commercially on an industrial scale.

Broadly, the present invention solves the problems of the prior art in this field by providing apparatus for welding joints between contiguous aligned cylindrical pipe sections, in which a welding device is mounted on a carriage for revolution about the contiguous ends of the pipe sections and in which provision is made for continuously pressing a flexible welding dam against the weld area.

Accordingly, it is an object of the present invention to provide apparatus for welding joints between contiguous aligned cylindrical pipe sections which is adapted to prevent the loss of molten metal from the weld.

Another object of the present invention is the provision of apparatus for welding joints between contiguous aligned cylindrical pipe sections, which is adapted to weld in either direction about the pipe sections.

A further object of the invention is the provision of apparatus for welding joints between contiguous aligned cylindrical pipe sections using a flexible welding dam, in which the parts adjacent the weld automatically accommodate irregularities in the members to be welded.

Finally, it is an object of the present invention to provide apparatus for welding joints between contiguous aligned cylindrical pipe sections, which will be relatively simple and inexpensive to manufacture, easy to adjust and to operate at high speeds, and safe, rugged and durable in use.

Other objects and advantages of the present invention will become apparent from a consideration of the following description, taken in conjunction with the accompanying drawings, in which:

Figure 1 is an elevational view of apparatus according to the present invention viewed endwise of a pipe line and showing in full line and in phantom line various operative positions of the invention;

Figure 2 is a fragmentary side elevational view of the structure of Figure 1;

Figure 3 is an enlarged view similar to Figure 1 but with parts in section and parts omitted for clarity;

Figure 4 is an enlared perspective view of the upper bracket mounting; and

Figure 5 is an enlarged cross-sectional view taken on the line 5—5 of Figure 3.

Referring now to the drawings in greater detail, there is shown generally at 1 an apparatus for welding joints between contiguous aligned cylindrical pipe sections 3 and 5 having beveled contiguous edges 7 for the reception and retention of a weld 9 therebetween. The apparatus comprises a frame 11 supported on the end section 3 of a pipe line by means of legs 13. Frame 11 carries a pair of plates 15 and 17 disposed in a common plane perpendicular to the axis of the pipe sections. Journalled for rotation in plates 15 and 17 about axes parallel to the axis of the pipe sections is a plurality of drive gears 19 certain of which are interconnected by a drive chain 21 extending between plates 15 and 17 and which may be drivingly rotated by a handle or by power means (not shown). Drive gears 19 are in train and the teeth of the final gears of the train mesh with the teeth of a ring gear 23 which is partially broken away so that it may be fitted over the pipe line. Gear 23 is provided with bayonet-slot recesses 25 on either side thereof in which are slidably received arcuate bayonet lugs (not shown) on each of plates 15 and 17.

The structure recited thus far has been described only briefly since it is merely conventional structure in another type of device for use on pipe lines, namely, the standard pipe end beveling machine. Therefore, the structure just described, taken alone, forms no part of the present invention.

Secured to and extending radially upward from ring gear 23 and disposed in a plane perpendicular to the axis of the pipe line is a bracket 27. Bracket 27 carries at its outer end a perpendicular arm 29 of channel cross-section having a flat web 31 and a pair of flanges 33 extending generally radially inwardly toward the pipe sections. A line intersecting the axis of the pipe sections and perpendicular to the plane of web 31 would also intersect the mid line of web 31.

Web 31 has a longitudinally extending elongated slot 35 therethrough; and an L-bracket 37 is slidably disposed on the upper surface of web 31 and has a vertical leg 39 and a horizontal leg 41 relative to web 31 when web 31 itself is horizontal. A clamping plate 43 parallel to leg 41 is slidably disposed on the radially inner side of web 31 and a bolt having a clamping wing nut 45 extends through plate 43, slot 35 and leg 41 releasably to clamp web 31 between leg 41 and plate 43 so as selectively to lock bracket 37 and the parts carried thereby in any of a plurality of positions along a path parallel to the axis of the pipe sections.

There is a hole through leg 39 of bracket 37 for receiving the screw-threaded stud of a clamping collar 45 held on by a wing nut 47 for easy assembly and disassembly. Collar 45 is of the split ring type which is operable to clamp or unclamp by manipulation of a wing nut 49.

The structure thus far described provides a carriage supported for revolution about the axis of the pipe sections.

A cylindrical barrel 51 is mounted in collar 45. When collar 45 is clamped on barrel 51, barrel 51 cannot move relative to the carriage; but when collar 45 is released, then barrel 51 is free to rotate relative to the carriage and to slide axially within collar 45. The axis of barrel 51 coincides with a radius of the pipe sections. Barrel 51 is closed at its upper end and open at its bottom end as seen in Figure 3 and provided adjacent its radially inner end with an inwardly extending dog screw 53 which is received in the slot 55 which extends longitudinally of shaft 57. The radially outer end of shaft 57 is cylindrical and slides coaxially in the radially inner end of barrel 51, dog screw 53 and slot 55 preventing relative rotation between barrel 51 and shaft 57.

Fixedly secured to shaft 57, one on either side thereof, is a pair of flat parallel plates 59. On one side of shaft 57, plates 59 carry an electrode holder indicated generally at 61 including a hollow tube 63 in the opposite ends of which is journalled for rotation a drive screw 65 having at the outer end thereof a flexible drive cable 67 which may be rotated by a handle or by power means (not shown) to rotate screw 65.

In screw-threaded engagement with and disposed about screw 65 within tube 63 is a nut 69 of a non-conductive material such as a hard plastic. Nut 69 has an arm 71 extending through a slot 73 disposed lengthwise of tube 63; and integral with and of the same material as nut 69 and arm 71 is a bracket 75 disposed outside tube 63 and slidable on the marginal edges of slot 73. Secured to bracket 75 is an electrode socket 77 to the outer end of which is connected in conductive relationship an electric cable 79 leading to a source of electric power (not shown).

The inner end of socket 77 replaceably receives and holds a consumable electrode 81 for supplying weld metal to weld 9.

Electrode holder 61 is adjustably mounted on plates 59 by means of pins 83 and 85, each of which extends outwardly on both sides of the radially inner end of tube 63 and are received respectively with friction fit in arcuate adjustment slots 87 and 89 through each of plates 59. In this way, the radially inner end of electrode holder 61 is secured between plates 59 against movement relative to those plates when the device is in operation; but the angle of electrode holder 61, and hence of electrode 81, may be adjusted relative to the carriage, and hence relative to the weld, by the exertion of substantial pressure on holder 61 so as to overcome the friction between pins 83 and 85 and the marginal edges of slots 87 and 89 respectively.

Guide means for electrode 81 are provided, comprising on the one side a peripherally grooved back-up roller 91 of a non-conductive material such as a hardened plastic journalled for rotation on pin 85 between plates 59, and on the other hand by a non-conductive roller 93 journalled for rotation between the ends of a pair spaced parallel bars 95 which in turn are journalled for rotation at their other ends between plates 59 on a pin 97 and are continuously urged toward electrode 81 by springs 99.

On the other side of shaft 57, plates 59 are comprised of ears 101 between which is carried a spool 103. Wound on spool 103 is a considerable length of flexible welding dam 105 which has the configuration of a flat tape, as seen in Figure 5, and which may be of glass fiber, asbestos, or any other flexible heat resistant material. Thus, it will be seen that ears 101 and spool 103 comprise means for supplying a flexible welding dam to the pipe joints.

The radially inner end of shaft 57 is bifurcated to form a yoke of which arms 107 carry between them a pin 109 on which is journalled for rotation a roller 111 having a cylindrical outer contour. During welding, the axis of roller 111 will always be parallel to the axis of the pipe sections. Shaft 57 with its associated roller 111 comprises a presser member for pressing dam 105 against contiguous portions of pipe sections 3 and 5 thereby to cover the fresh weld and prevent the loss of molten weld metal.

It will be noted that the presser member, the electrode holder and the means for supplying a flexible welding dam to the pipe joints comprise a unitary assembly. This assembly as a unit is continuously urged radially inwardly by a coil compression spring 113 disposed within barrel 51 and acting between the underside of the closed upper end of barrel 51 and the upper side of the upper end of shaft 57 as seen in Figure 3.

Thus, the unitary assembly described immediately above has three adjusting movements as a unit relative to the carriage: movement radially of the axis of the pipe sections under the influence of spring 113, rotation about an axis extending radially of the axis of the pipe sections when collar 45 is released, and movement parallel to the axis of the pipe sections when web 31 is released from clamping engagement between leg 41 and plate 43.

The operation of the apparatus according to the present invention is as follows:

With the device in the position shown in phantom line at the bottom of Figure 1, collar 45 is loosened and barrel 51 moved downwardly therethrough until roller 111 is spaced below sections 3 and 5. The free end of dam 105 is pulled out and fed about the side of roller 111 opposite spool 103, between roller 111 and the pipe sections. Barrel 51 and the unitary assembly are then moved back up through collar 45 until roller 111 presses dam 105 firmly against the outer surfaces of contiguous portions of sections 3 and 5, thereby bridging the gap between beveled edges 7. Nut 49 is then tightened The arc is then struck and gears 19 are driven to cause the carriage to revolve clockwise up and about the pipe sections as seen in Figure 1 toward the position shown in full line therein. The first weld metal secures dam 105 in place, and as the carriage revolves further, dam 105 is paid out and applied.

During the actual welding operation, the unitary assembly described above has movement relative to the carriage only radially of the axis of the pipe sections, and even then only to the extent necessary to accommodate irregularities such as might render weld 9 non-circular. Nevertheless, it should be noted that since the means for supplying dam 105, the presser member and the electrode holder are all in unitary assembly, such relative radial movement will not affect the relationship of these parts relative to each other, so that dam feed, electrode position and the position of the presser member will have a fixed relationship relative to each other throughout the operation. Of course, electrode 81 will be gradually consumed, but the turning of drive cable 67 during the welding operation will continuously feed electrode 81 toward the weld to maintain a constant electrode orientation.

When the full line position shown at the top of Figure 1 is reached, the operation is stopped, dam 105 is cut and the loose end of the dam extending from the end of the weld is trimmed off. Then wing nuts 45 and 49 are loosened and barrel 51 and the unitary assembly are rotated together 180° about the axis of barrel 51. In order that ears 101 and the dam 105 carried on spool 103 may clear bracket 27, barrel 51, and with it the unitary assembly, is moved through slot 35 along a path parallel to the axis of the pipe sections away from bracket 27. After rotation through 180° in this manner, plates 59 are again parallel to bracket 27 and barrel 51 and the unitary assembly may be moved back through slot 35 until they are again positioned directly over the weld. Thus, the movement parallel to the axis of the pipe sections through slot 35 performs the dual function not only of permitting 180° reversal of the parts but also of permitting accurate positioning of electrode 81 and dam 105 relative to weld 9 without the necessity for the accurate positioning of frame 11 on pipe section 3.

With wing nut 45 again tightened, the device in its reverse position is run back down to a lowermost position the reverse of that shown in phantom line in Figure 1 and the preliminary steps relating to the positioning of dam 105 and the tightening of wing nut 49 repeated; and this time, upon striking the arc, the carriage is run up in the opposite direction, counterclockwise about the pipe sections, until a continuous circular weld 9 is completed at the top.

From a consideration of the foregoing, it will be obvious that all of the initially recited objects of the present invention have been achieved.

Although the present invention has been described in connection with preferred embodiments, it is to be understood that modifications and variations may be resorted to without departing from the spirit of this invention, as those skilled in this art will readily understand. Such modifications and variations are considered to be within the purview and scope of the present invention as defined by the appended claims.

What is claimed:

1. Apparatus for welding joints between contiguous aligned cylindrical pipe sections, comprising a carriage, means supporting the carriage for revolution about the axis of contiguous aligned cylindrical pipe sections, a unitary assembly comprising a welding electrode holder and a presser member for pressing a flexible welding dam against contiguous portions of the pipe sections, means mounting the unitary assembly on the carriage for movement relative to the carriage toward and away from the axis of the pipe sections, and means yieldably urging the unitary assembly toward the axis of the pipe sections.

2. Welding apparatus as claimed in claim 1, the unitary assembly including means for supplying a flexible welding dam to the pipe joints.

3. Apparatus for welding joints between contiguous aligned cylindrical pipe sections, comprising a carriage, means mounting the carriage for revolution about the axis of contiguous aligned cylindrical pipe sections, a unitary assembly comprising a welding electrode holder and a presser member for pressing a flexible welding dam against contiguous portions of the pipe sections, means mounting the unitary assembly on the carriage for rotation relative to the carriage about an axis extending radially of the axis of the pipe sections, and means for locking the unitary assembly in either of a pair of positions of rotation a half turn apart for welding in either direction about the pipe sections.

4. Welding apparatus as claimed in claim 3, the unitary assembly including means for supplying a flexible welding dam to the pipe joints.

5. Welding apparatus as claimed in claim 3, the means mounting the unitary assembly on the carriage comprising means mounting the unitary assembly for movement relative to the carriage toward and away from the axis of the pipe sections, and means yieldably urging the unitary assembly toward the axis of the pipe sections.

6. Welding apparatus as claimed in claim 5, the unitary assembly including means for supplying a flexible welding dam to the pipe joints.

7. Apparatus for welding joints between contiguous aligned cylindrical pipe sections, comprising a carriage, means supporting the carriage for revolution about the axis of contiguous aligned cylindrical pipe sections, a unitary assembly comprising a shaft and a welding electrode holder, the shaft being disposed radially of the axis of the pipe sections and having a presser member at its radially inner end for pressing a flexible welding dam against contiguous portions of the pipe sections, the presser member having a circular cross-sectional contour in a plane perpendicular to the axis of the pipe sections, means mounting the unitary assembly on the carriage for movement relative to the carriage axially of the shaft, and means yieldably urging the unitary assembly toward the axis of the pipe sections.

8. Welding apparatus as claimed in claim 7, the unitary assembly including means for supplying a flexible welding dam to the pipe joints.

9. Welding apparatus as claimed in claim 7, and means mounting the unitary assembly for rotation relative to the carriage about the axis of the shaft, and means for locking the unitary assembly in either of a pair of positions of rotation a half turn apart for welding in either direction about the pipe sections.

10. Welding apparatus as claimed in claim 9, the unitary assembly including means for supplying a flexible welding dam to the pipe joints.

11. Welding apparatus as claimed in claim 7, the presser member comprising a roller rotatable about an axis parallel to the axis of the pipe sections.

References Cited in the file of this patent

UNITED STATES PATENTS

| | | |
|---|---|---|
| 2,013,630 | Goldsborough | Sept. 3, 1935 |
| 2,673,916 | Meyer | Mar. 30, 1954 |
| 2,677,036 | Meyer et al. | Apr. 27, 1954 |
| 2,721,248 | Kirkpatrick | Oct. 18, 1955 |
| 2,795,689 | McNutt | June 11, 1957 |